(12) United States Patent
Liu et al.

(10) Patent No.: US 11,769,209 B2
(45) Date of Patent: Sep. 26, 2023

(54) METHOD AND SYSTEM FOR CONDUCTING AND RECORDING INSURANCE CLAIM TRANSACTIONS USING BLOCKCHAIN

(71) Applicant: MediConCen Limited, Hong Kong (HK)

(72) Inventors: Yuxiang Liu, Hong Kong (HK); Kwong Wing Yeung, Hong Kong (HK)

(*) Notice: Subject to any disclaimer, the term of this patent is extended or adjusted under 35 U.S.C. 154(b) by 215 days.

(21) Appl. No.: 17/371,098

(22) Filed: Jul. 8, 2021

(65) Prior Publication Data
US 2022/0036471 A1 Feb. 3, 2022

Related U.S. Application Data

(60) Provisional application No. 63/059,211, filed on Jul. 31, 2020.

(51) Int. Cl.
*G06Q 40/08* (2012.01)
*G06Q 10/08* (2023.01)
(Continued)

(52) U.S. Cl.
CPC ......... *G06Q 10/08* (2013.01); *G06K 7/10297* (2013.01); *G06Q 20/389* (2013.01);
(Continued)

(58) Field of Classification Search
None
See application file for complete search history.

(56) References Cited

U.S. PATENT DOCUMENTS 9,722,790 B2 * 8/2017 Ebrahimi ........... G06Q 20/3825
11,495,336 B2 * 11/2022 Piron ..................... G06Q 30/04
(Continued)

FOREIGN PATENT DOCUMENTS

CN 109389513 A 2/2019
CN 109584082 A 4/2019
(Continued)

OTHER PUBLICATIONS

KR101983558A1—machine translation (Year: 2018).*
TWM 568438U—machine translation (Year: 2018).*

*Primary Examiner* — Paul S Schwarzenberg (57) ABSTRACT

A method and system for conducting and recording insurance claim transactions using blockchain is provided. The method comprises the steps of: receiving a first verification element from a claimant at an authenticated provider device of a provider; verifying an eligibility of said claimant at a financer and an eligibility of said provider at a provider network according to said first verification element and said provider device; receiving a second verification element from said claimant at said provider device, said second verification element being distinct from said first verification element; conducting said insurance claim transaction by triggering a transaction chaincode at said provider device according to said second verification element; recording an entry of said insurance claim transaction on a blockchain ledger of a blockchain system; wherein a hashed value of an irreversible hash of said first verification element and said second verification element is stored in a global ledger of said blockchain system, and said entry of insurance claim transaction is stored in a private ledger of said blockchain system only accessible by said financer and said provider network; wherein a proof of claim of said insurance claim transaction is collected from said provider device at the time said transaction chaincode is triggered.

18 Claims, 7 Drawing Sheets

(51) Int. Cl.
  *G06Q 20/38*  (2012.01)
  *G06K 7/10*  (2006.01)
  *H04L 9/08*  (2006.01)
  *H04L 9/32*  (2006.01)
  *G06Q 20/40*  (2012.01)
  *G06Q 20/34*  (2012.01)

(52) U.S. Cl.
  CPC ..... *G06Q 20/3827* (2013.01); *G06Q 20/3829* (2013.01); *G06Q 20/38215* (2013.01); *H04L 9/088* (2013.01); *H04L 9/3239* (2013.01); *G06Q 20/352* (2013.01); *G06Q 20/409* (2013.01)

(56) References Cited

U.S. PATENT DOCUMENTS

2014/0279499 A1* 9/2014 Kane ................. G06Q 20/3274
  705/44
2020/0177373 A1* 6/2020 Komandur ............ H04L 9/3247

FOREIGN PATENT DOCUMENTS

KR      101983558 A1 * 5/2018   ............. G06Q 10/10
TW      M 568438 U  * 3/2018   ............. G06Q 40/10

* cited by examiner

Submitted

Collect fee from claimant
$xxx

Co-payment
$xxx

Extra medication
$xxx

Collect from network
$xxx

Doctor details
Doctor name (code)
Doctor category

Patient details
...

METHOD AND SYSTEM FOR CONDUCTING AND RECORDING INSURANCE CLAIM TRANSACTIONS USING BLOCKCHAIN

INDEX TO RELATED APPLICATIONS

The present invention claims the benefit of U.S. provisional application No. 63/059,211 filed on Jul. 31, 2020, entitled "A Method to Automate Insurance and Government Financing Claim Using Hyperledger Fabric Blockchain", the disclosure of which is incorporated herein by reference in its entirety.

FIELD OF INVENTION

The present invention relates to the field of conducting and recording transactions, in particular relates to a method of conducting and recording transactions using blockchain, more specifically transactions that require additional information to be collected, such as insurance claim transactions.

BACKGROUND OF INVENTION

Some transactions, such as insurance claim transactions, differ from normal transactions in that apart from the transaction amount, a proof of claim has to be collected for the insurance claim to be processed and settled. The collection of proof of claim generally involves multiple parties and also a lot of paperwork, and results in a lengthy time delay before a provider actually receives the fund from a financer. Recording of transactions are also not convenient to be reviewed by the claimant for example, and fraudulent claims often occur which causes loss to the financer. Therefore, an improved method of conducting and recording insurance claim transactions is desired.

SUMMARY OF INVENTION

In forelight of the above-mentioned problem, a method of conducting and recording transactions is presented. The method of the present invention utilizes blockchain to provide a secure and tamper-resistant record of insurance claim transactions, while still maintaining a degree of security to personally identifiable information. Two distinct verification elements are utilized to ensure all parties agree to proceed to the next step at different stages of the transaction, thus protecting the interests of all parties. The proof of claim is collected electronically instantaneously as the electronic transaction occurs, such that the claim amount can be settled instantly without further paperwork and time delay.

In an embodiment of the present invention, a method for conducting and recording insurance claims transactions is provided, the method comprising the steps of:
  receiving a first verification element from a claimant at an authenticated provider device of a provider;
  verifying an eligibility of said claimant at a financer and an eligibility of said provider at a provider network according to said first verification element and said provider device;
  receiving a second verification element from said claimant at said provider device, said second verification element being distinct from said first verification element;
  conducting said insurance claim transaction by triggering a transaction chaincode at said provider device according to said second verification element;
  recording an entry of said insurance claim transaction on a blockchain ledger of a blockchain system;
  wherein a hashed value of an irreversible hash of said first verification element and said second verification element is stored on a global ledger of said blockchain system, and said entry of insurance claim transaction is stored in a private ledger of said blockchain system only accessible by said financer and said provider network; wherein a proof of claim of said insurance claim transaction is collected from said provider device at the time said transaction chaincode is triggered.

In a preferred embodiment, said first verification element and said second verification element comprises a two-dimensional barcode generated by a claimant device authenticated by said financer. In another preferred embodiment, said first verification element and said second verification element comprises an alphanumerical string generated by a claimant device authenticated by said financer.

In an alternate embodiment, said claimant device is an NFC-enabled member card, said first verification element and said second verification element comprises a unique identifier of said member card, a private key of said member card and an encrypted claimant identifier of said claimant at said financer. In a further embodiment, said NFC-enabled member card comprises a manufacturer block which is only readable for preventing cloning of said member card.

In another exemplary embodiment, said provider device is a NFC card scanner, said private key of said member card encrypts said claimant identifier to obtain an encrypted member data when said card reader scans said member card, said eligibility of said claimant is verified by decrypting said encrypted member data at a provider network backend server connected to the provider device.

In a further embodiment, said step of conducting said insurance claim transaction comprises the steps of: receiving an original second verification element at said provider device; performing said irreversible hash on said received original second verification element; comparing said hashed second verification element generated from said triggering of said transaction chaincode to said hashed second verification element stored on said global ledger; conducting said insurance claim transaction if said hashed second verification element generated from said triggering of said transaction chaincode matches said hashed second verification element stored on said global ledger.

In another aspect of the present invention, a system for conducting and recording insurance claim transactions using blockchain is provided. The system comprises: a blockchain system; a financer backend server connected to said blockchain system through a financer blockchain application; a provider network backend server connected to said blockchain system through a provider network blockchain application; a claimant device connected to said financer backend server; a provider device connected to said provider network backend server;
  wherein said provider device receives a first verification element from said claimant device to verify an eligibility of a claimant at a financer and through claimant device, and to verify an eligibility of a provider at a provider network though said provider device; said provider device receives a second verification element distinct from said first verification element to conduct an insurance transaction by triggering a transaction chaincode;
  wherein said blockchain system comprises a global ledger and a private ledger, an irreversible hashed value of said first verification element and said second verification element is stored in said global ledger, and an entry of said insurance transaction is recorded in said private ledger only accessible by said financer backend server and said provider network backend server; wherein a proof of claim is collected from said provider device at the time said insurance transaction is conducted.

The method and system of the present invention comprises two distinct verification elements, which allows splitting of the steps of verification of eligibility and authorization to conduct the transaction. The method also makes use of blockchain system to collect the proof of claim and also ascertain contracts between the financer and the claimant. An irreversible hash is utilized to ensure security of information stored in the blockchain ledger and prevents fraudulent claims.

DETAILED DESCRIPTION OF INVENTION

In the embodiments described below, a medical claim insurance transaction is used as an example. Throughout the specification, the term "financer" may include insurance companies or governments etc., where "provider" may include doctors or other medical service providers, "provider network" may include medical groups or organizations, "claimable task" may include medical services such as medical treatment or prescription of medications, and "claimant" may include patients who seek medical service from a doctor. One skilled in the art will understand that the concept of the present invention can be applied to other types of insurance claims or other transactions by making necessary changes to the details without departing from the scope of the invention.

Flow of Conducting and Recording Insurance Claim Transactions

FIG. 1 and FIGS. 2A to 2M show a flow chart of a method of conducting and recording insurance claim transactions and screenshots along the flow according to an embodiment of the present invention.

Figure 1:
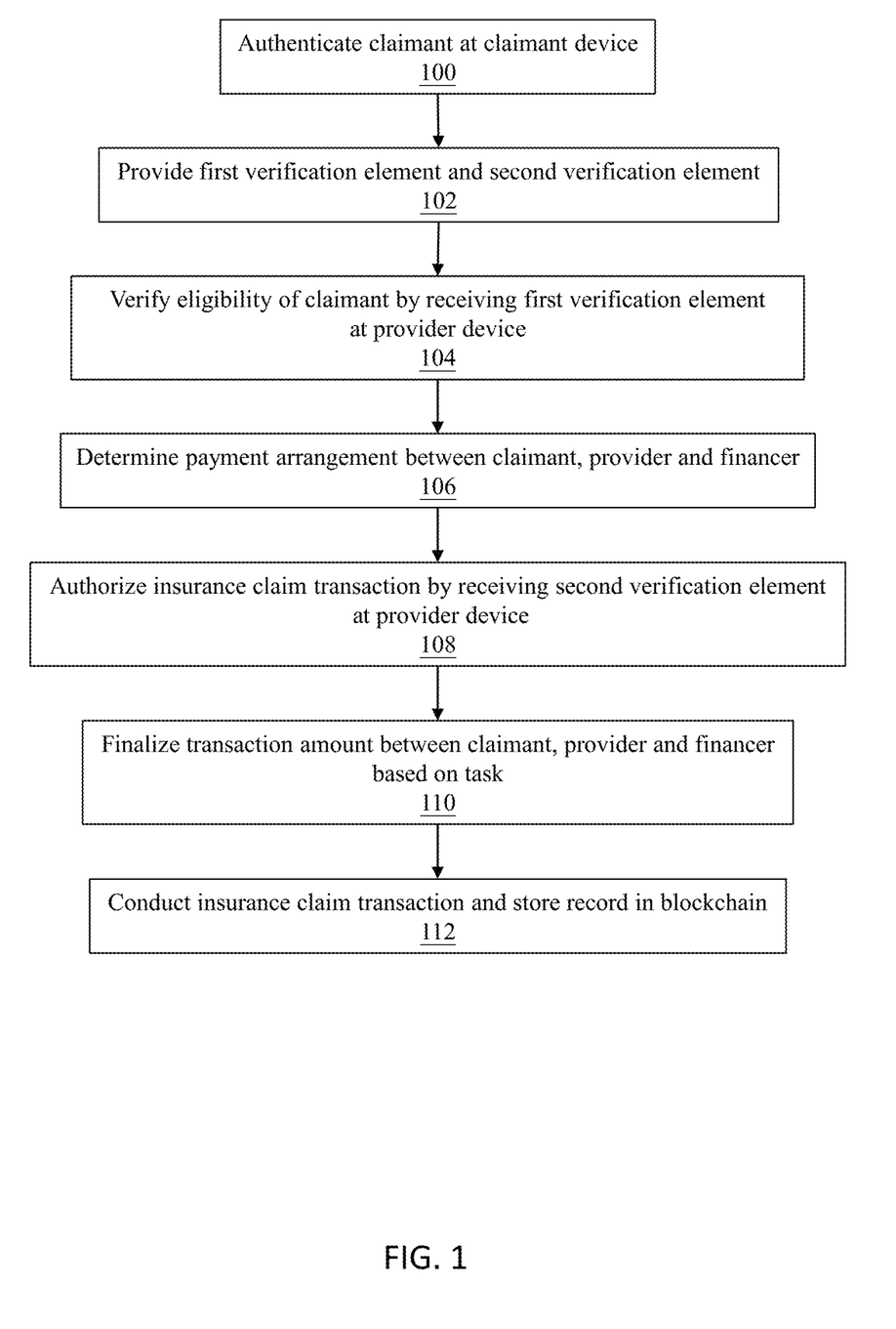
FIG. 1 is a flow chart of a method of conducting and recording insurance claim transactions according to an embodiment of the present invention.

In step 100, a claimant device is provided to authenticate a claimant. The claimant device can be provided by a financer or a third party such as a platform or solution provider, and can be provided in the form of a mobile phone having a claimant mobile application installed therein, or a computer with a claimant interface website opened, or a dedicated device. The claimant device is connected to a financer backend server through internet. At a login portal, the claimant device receives authentication information such as login ID and password from the claimant, and then communicates with the financer backend server to authenticate the claimant. Each financer has its own financer backend server, and if the claimant is a member of multiple financers, one of the financers may authenticate the claimant, or all financers may authenticate the claimant at the same time, depending on the configuration of the claimant device. The financer backend server further communicates with a blockchain system through a financer blockchain application. In a preferred embodiment, the blockchain system is a Hyperledger Fabric blockchain system.

Figure 2A:
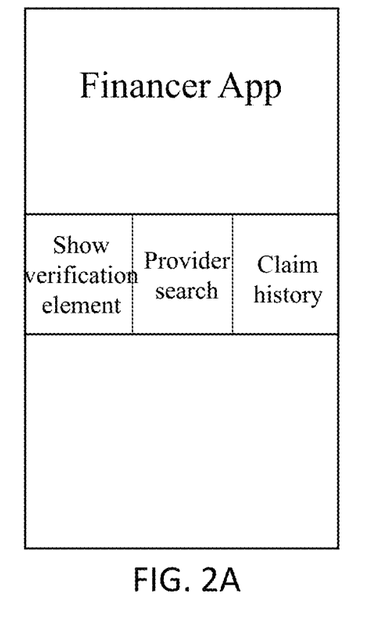
FIG. 2A to FIG. 2M are sample screenshots of claimant device and provider device at different steps of the method of FIG. 1.
Figure 2B:
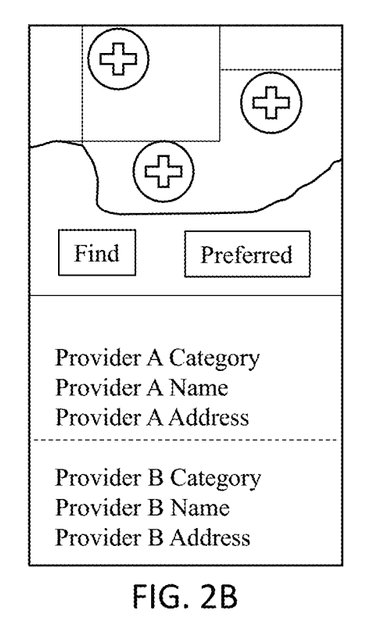

After successful authentication, a home screen as shown in FIG. 2A is displayed at the claimant device to allow the claimant to search for eligible providers, review claim history or perform other actions. Eligible providers may be dependent on the insurance policy of the claimant, for example only certain categories of providers may be eligible for certain policies. Upon receiving an instruction to search for providers through the "doctor search" button, a list of eligible providers is displayed to the claimant. As shown in FIG. 2B, in an embodiment, the locations of the providers are displayed on a map, and detailed information such as provider network, name, address and phone number etc. of each provider displayed above are overlayed at a bottom part of the screen. The map information may be obtained from an external source, and operations such as searching, zooming or filtering are supported to facilitate the claimant to find a specific provider. In a further embodiment, the claimant device also allows the claimant to make an appointment to a provider at a specific date and time. The claimant device will notify the provider of the appointment through a provider device as an example.

Figure 2C:
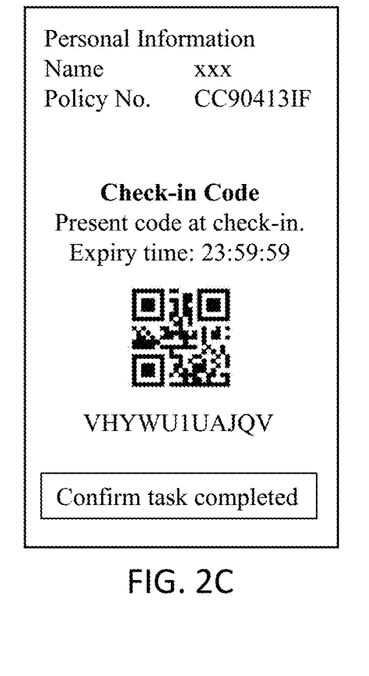
Figure 2D:
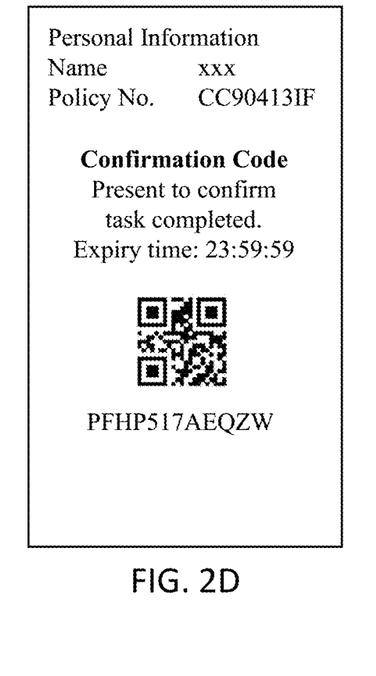
Figure 2E:
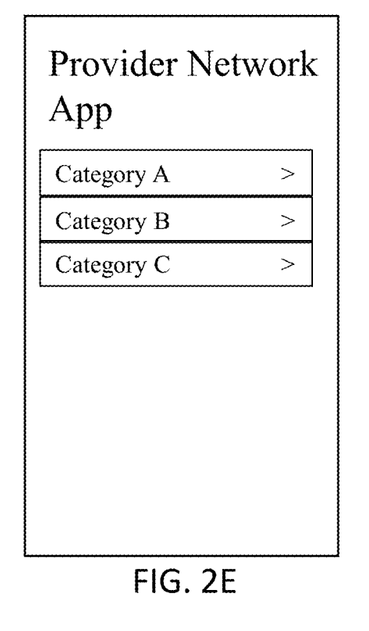
Figure 2F:
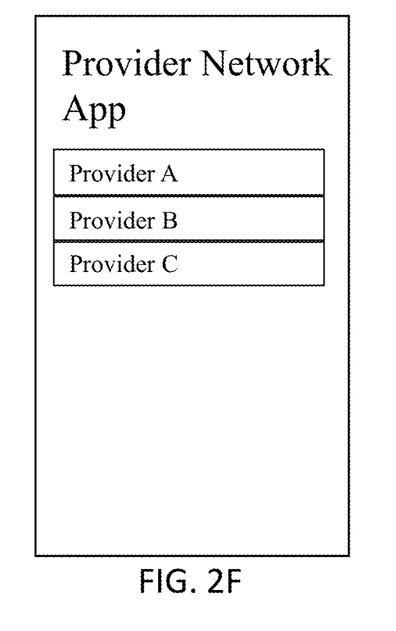

In step 102, a first verification element and a distinct second verification element are generated and provided to the claimant. As an example, the verification elements are generated when receiving the claimant's confirmation of choice of eligible provider in FIG. 2A. FIG. 2C shows a sample first verification element and FIG. 2D shows a sample second verification element, and they are generated at the same time. As shown in FIG. 2C and FIG. 2D, the first verification element (shown as "Check-in code") and the second verification element (shown as "Confirmation code") each comprises a two-dimensional barcode, such as QR code. The two-dimensional barcode can be saved in the mobile app or printed out from the website. The two-dimensional barcode can be read or detected by a provider device, which will be explained in more detail below. In an embodiment, the verification element also comprises a string of characters that represent the two-dimensional barcode, which allows the string of characters to be entered as an alternative to reading the two-dimensional barcode. As illustrated in FIG. 2C and FIG. 2D, the screen showing a verification element can also display the name and policy of the claimant and the expiry time of the verification element if any. For example, the expiry time can be set as the end of appointment date, or a fixed number of days from generation of the verification element. In an embodiment, the first verification element is always displayed before the second verification element by providing a button at FIG. 2C to proceed to FIG. 2D. This aligns with the flow of the process, and therefore can reduce confusions between two verification elements.

At the time the verification elements are generated, the financer backend server also stores a version of the verification elements in the blockchain to allow for the provider device to verify the eligibility of the claimant in later steps. In a preferred embodiment, a hashed value of the verification element is stored in a global ledger of the blockchain, allowing all participants of the blockchain system including all financers, all provider networks and also the members thereof to access the global ledger. The hash is an irreversible hash such as SHA512 such that the hashed value cannot be reversed to obtain the original verification element for improved security.

In another preferred embodiment, the first verification element and the second verification element are provided in an NFC-enabled member card. The member card has a name of the claimant printed thereon, and a member card identifier (ID) unique to the card and an encrypted member ID of a financer are stored therein. The name of the claimant and the actual member ID is not stored in the card to avoid leakage of claimant information. For example, a member card having a member ID of "A12345" may be stored in the card as "ABCDE". The member card also comprises a manufacturer block which is only readable in nature to prevent others from cloning the member card.

In a preferred embodiment, the first verification element and the second verification element are provided such that they can only be used once before expiring. This feature helps reducing the risk of repeated use or unintended use of the verification elements for the purpose of fraud claiming.

After the verification elements are provided, the claimant visits the provider. A provider device is provided for the provider to be authenticated by a provider network. The provider device can be provided in the form of a mobile phone having a claimant mobile application installed therein, a computer with a provider interface website opened, or a dedicated device. For example, in FIG. 2E and FIG. 2F, screens for choosing a provider category and a provider name are shown. In different embodiments, multiple providers may share a same login identity or individual providers have a unique identity so that the steps for choosing the provider can be skipped. The provider device is connected to and communicates with a provider network backend server, which is in turn connected to and communicates with the blockchain system through a provider network blockchain application.

Figure 2G:
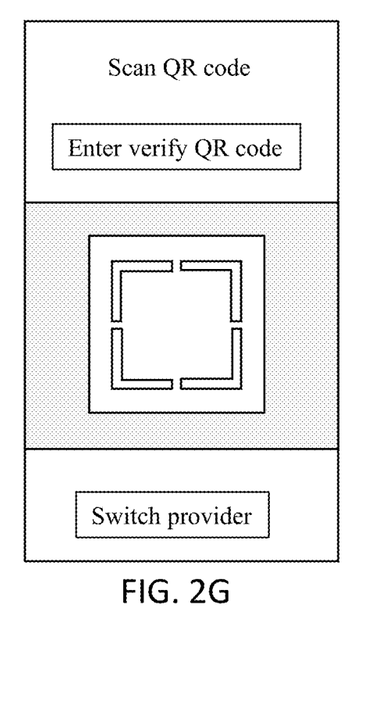

In step 104, the provider verifies the eligibility of the claimant to claim insurance from a financer, and also the eligibility of the provider to provide service under the provider network, by receiving the first verification element from the claimant using the provider device. The claimant shows the first verification element to the provider, either by displaying the first verification element on a mobile device, where the mobile device may be the claimant device that generates the first verification element or receives the first verification element from a claimant device, or printed out on paper from a claimant device. The provider device then receives the first verification element by reading the two-dimensional barcode using a camera of the provider device such as a mobile phone. Alternatively, the string of characters representing the two-dimensional barcode can be typed into the provider device. Both input types are available in the screen of the provider device as shown in FIG. 2G. In a further embodiment, the provider name and category can be displayed on the screen as well to ensure the provider has chosen the correct identity.

In another embodiment where the first verification element is provided in an NFC-enabled member card, the provider device can be a dedicated NFC card reader provided by the provider network, that has a unique private key that is known only to the provider network but unknown to the provider. Each card reader is linked to a provider and therefore the dedicated card reader can be deemed to be authenticated at all times. The card reader can also be linked to other authenticated provider devices to allow for input of other details of the transaction.

When the provider device reads the first verification element, the first verification element is sent to the provider network backend server for verification. In one embodiment, the verification process includes performing a hash on the two-dimensional barcode or the input string of the first verification element, and comparing with the record stored in the global ledger of the blockchain system, and only confirming the eligibility of the claimant if the values match. The record in the global ledger is generated at the same time the first verification element is generated, which may also include issuer, claimant, provider, and/or appointment date information etc. The hash operation is preferably an irreversible hash operation with high level of security such as SHA512 hash, such that one will not be able to reverse the hashed values to obtain the original input. The eligibility of the provider can be confirmed by comparing the provider information in the first verification element with the identity of the provider device sending the first verification element to the provider network backend server.

In another embodiment, when the card reader of the provider reads the NFC-enabled member card of the claimant, the card reader receives the member data stored in the member card including encrypted member ID and unique card ID, and then encrypts the member data and date/time stamp using the unique private key to produce an encrypted member data. The encrypted member data is then sent to the provider network backend server. The encrypted member data is dynamically generated with each read or scan by using date/time as an input, such that no parties can use the data in another instance. The provider network backend server stores the private keys of all card readers, and can decrypt the encrypted member data with the correct private key. The private key is not known to the provider himself, therefore only the provider network is able to decrypt the encrypted member data, and as such, a successful decryption automatically confirms the eligibility of both the claimant and the provider at the same time.

Figure 2H:
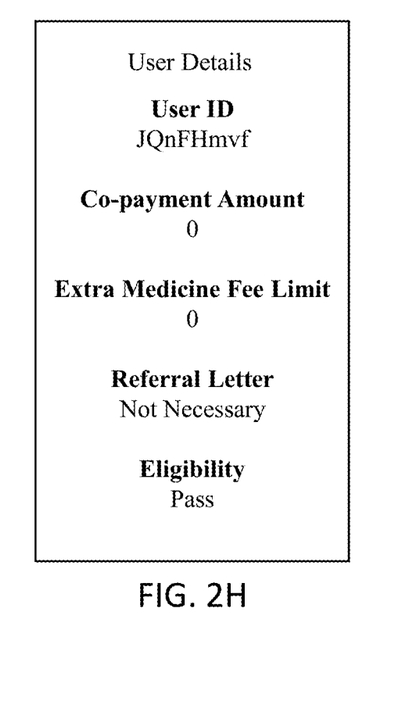

After verifying that the claimant is eligible to claim insurance from the financer at the provider, as shown in FIG. 2H, in step 106, a payment arrangement is determined between the claimant, the provider and the financer based on the eligibility of the claimant. As different claimants have different insurance policies, the payment arrangement of different tasks will always vary, and the claimable amount may also change based on the claim history of the claimant. In more complex cases, multiple policies may be involved or multiple financers may share partial amounts of the claim with a predetermined decision logic. In this step, all contracts between the claimant and different financers are referred to and the payment arrangement is determined. The payment arrangement information is shown to both the provider and the claimant, for example by displaying at both the provider device and the claimant device, or displaying at the provider device and shown to the claimant. Requirements for the insurance claim such as proof of necessity will also be collected in this step. In this example, a user ID of the claimant, a co-payment amount, an extra medicine claim limit, whether a referral letter is necessary, and a proof of eligibility are displayed.

Figure 2I:
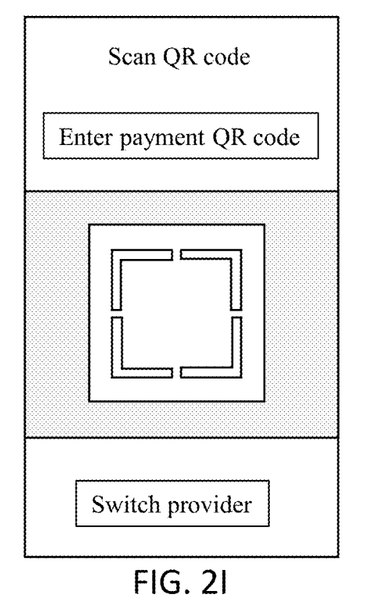

Once the payment arrangement is determined and both the provider and the claimant agree to the payment arrangement, a claimable task which is the subject of the insurance claim transaction is performed. After the claimable task is performed, in step 108 of the method, the provider receives the second verification element from the claimant using the provider device to authorize the conduction of insurance claim transaction by the provider and claimant. As shown in FIG. 2I, the method of reception of the second verification element is similar to the first verification element as mentioned in step 104 above. In an example, after receiving an original second verification element at the provider device, the provider network backend server performs an irreversible hash on the received original second verification element to generate a hashed second verification element. The irreversible hash function is the same hash function as the one used when the second verification element is generated at the claimant device, where a copy thereof is stored in the global ledger. The hashed second verification element generated is then compared to the hashed value of said second verification element stored in the global ledger, and the insurance claim transaction is conducted if the hashed second verification element generated matches the hashed second verification element stored in the global ledger.

Figure 2J:
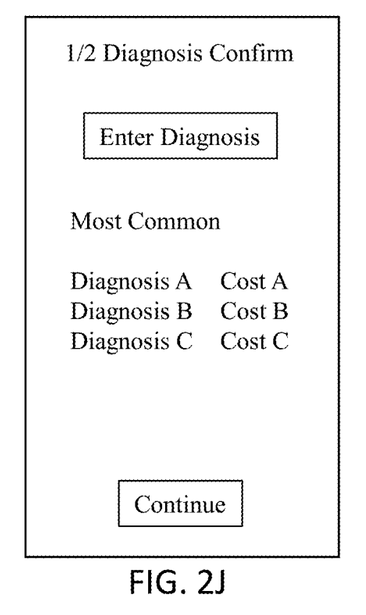
Figure 2K:
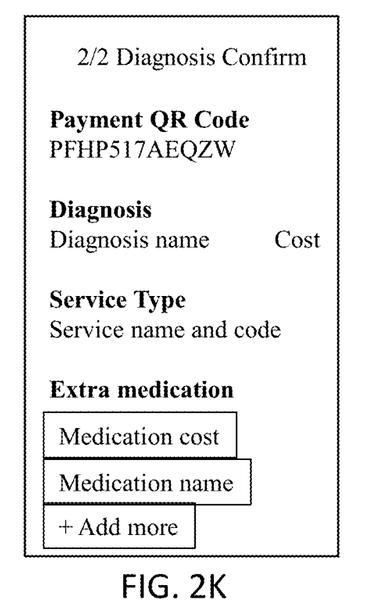

In step 110, a transaction amount of the insurance claim transaction is finalized between the claimant, the provider and the financer(s) based on the claimable task performed and the payment arrangement agreed in step 106 above. In FIG. 2J, details of each task, including task description or task code and the cost are entered by the provider at the provider device. For example, in medical insurance claims, the tasks may include diagnosis name and/or treatment name. In FIG. 2K, the extra medication names and their cost are also entered by the provider at the provider device. The entered information is shown to the claimant at the claimant device (or through the provider device if member card is used) as well and similar to the payment arrangement above. In FIG. 2K, the second verification element represented by a string and the service type of the provider is also displayed. The provider device communicates with the provider network backend server to confirm that the cost of treatment for the entered diagnosis is normal and customary.

Figure 2L:
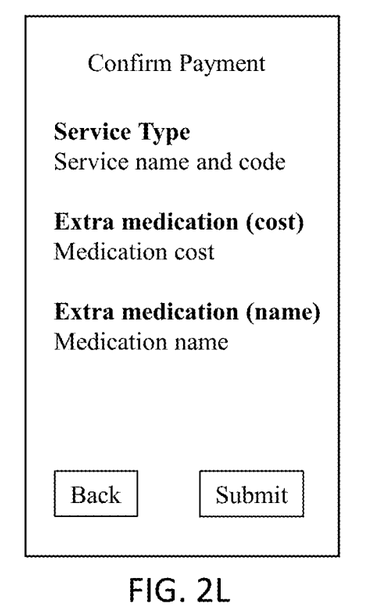
Figure 2M:
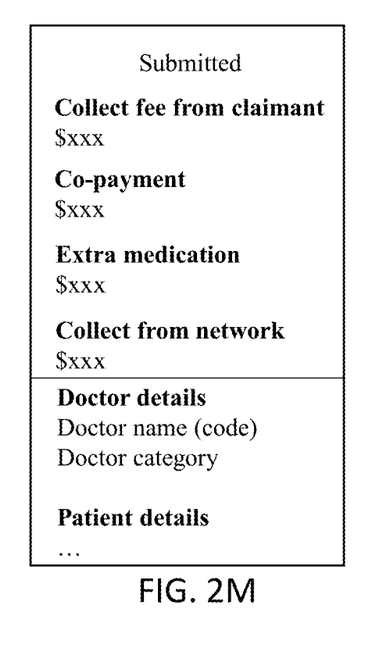

After all information is entered by the provider and received by the provider device, in step 112, a final confirmation screen as shown in FIG. 2L is displayed at the provider device, where the insurance claim transaction will be conducted once an instruction to submit is received. The insurance claim transaction is conducted by triggering a transaction chaincode at the provider network backend server through the provider network blockchain application, and the insurance claim transaction is recorded on a private ledger of the blockchain system, where only the related financer and provider network is able to access the records and check for entries and changes. The financer through the financer blockchain application monitors the blockchain ledger for any insurance claim transactions that takes place, and retrieves the claimant identity, provider network identity and claim amount of the insurance claim transaction. The financer then pays the claim amount to the provider network by electronic transaction, and also updates the claim history of the claimant accordingly. The provider network through the provider network blockchain application also monitors the blockchain ledger and retrieves the provider identity, claim amount, then pays the claim amount to the provider by electronic transaction. Other costs not covered by insurance will be calculated and recorded in the blockchain ledger, and settled outside the system between the claimant and the provider. FIG. 2M shows a screen at the provider device after submission of the insurance claim, where the respective amounts to be collected from the claimant and the provider network is shown.

In an insurance claim transaction, a proof of claim is required for the financer to settle the claim. In general, proof of claim includes, inter alia, a proof that the claimable task is performed, proof of eligibility of claimant, proof of necessity of the claimable task, proof of eligibility of provider, confirmation that the cost of the task is normal and customary, and that the cost is not previously reimbursed to constitute a double claim. In the method of the present invention, the proof of eligibility of claimant and provider is confirmed by receiving the first verification element from the claimant at the authenticated provider device in step 104. The proof that the task is performed is confirmed in step 108 by receiving the second verification element as digital signatures of both the claimant and the provider. The proof of necessity is received at the provider device during step 106, for example by receiving a necessity input such as confirming that any required referral letter is received. Confirmation that the cost is normal and customary is automatically obtained in step 110, where the tasks and amounts entered by the provider are analyzed by the blockchain system before the transaction can be posted. The blockchain system also includes an algorithm to check whether the claimant has contracts with multiple financers to avoid issuing double claims. Therefore, the proof of claim is collected at the time the insurance claim transaction is posted on the blockchain ledger, and the claim amounts can be settled instantly without any delay due to procedural requirements. This feature greatly reduces tedious paperwork and time for preparing the proof of claim in existing systems, and also prevents errors or frauds from happening.

Structure of Blockchain-Based System for Conducting and Recording Transactions

Figure 3:
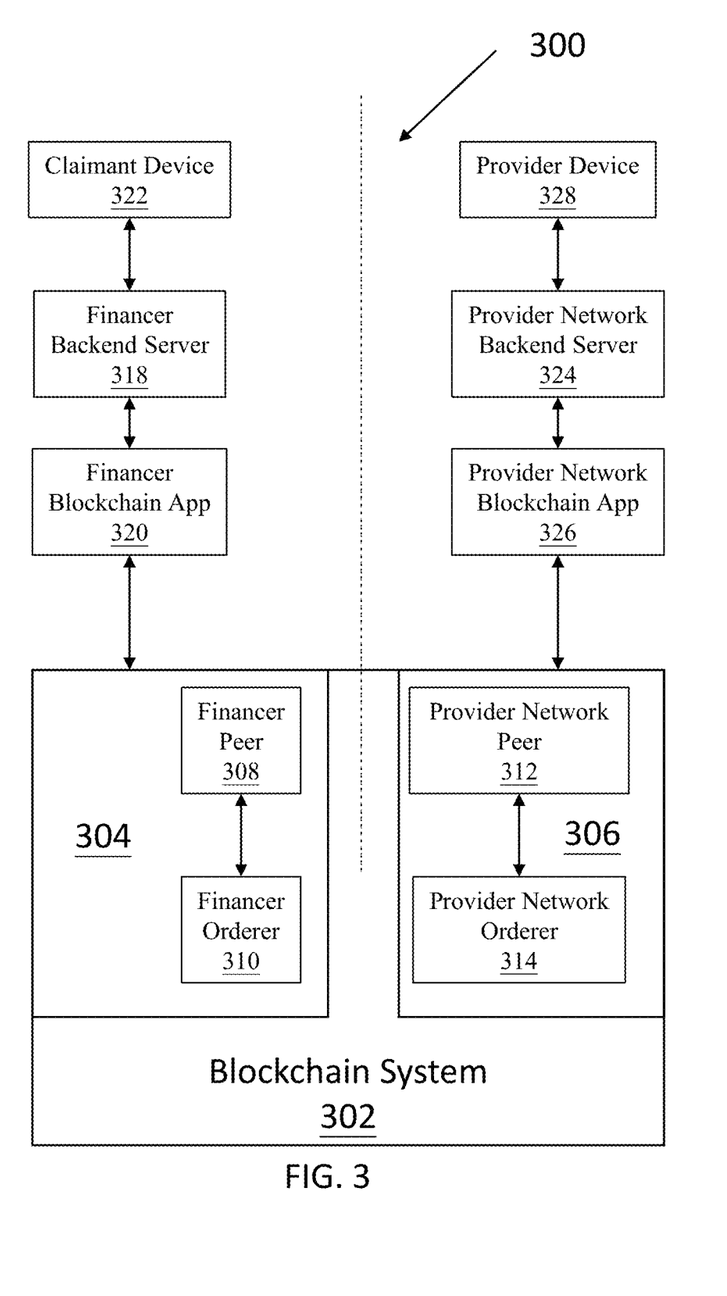
FIG. 3 is a system block diagram of a system for conducting and recording insurance claim transactions according to an embodiment of the present invention.

FIG. 3 shows a system block diagram of the present invention. The system 300 comprises a blockchain system 302. In a preferred embodiment, the blockchain system 302 is a Hyperledger Fabric blockchain system. The blockchain system includes a blockchain ledger which is the sequenced, tamper-resistant record of all state transitions. The ledger comprises of a blockchain to store the immutable, sequenced record in blocks, as well as a state database to maintain current state, which allows the current value of an object in the ledger to be located. The blockchain system also includes blockchain peers which are owned by each financer or provider network. Each peer maintains a copy of the ledger for each channel of which they are a member. Peers host ledgers and smart contracts. The blockchain system also includes a blockchain orderer, which accept transactions and generate and deliver blocks. The orderers only order transactions and do not open the transactions, which means orderers will not read the data inside a transaction block. One of the advantages of utilizing the Fabric is that private data, such as personally identifiable information, do not go through the orderers at all. Consensus engine is also driven by orderers to update copies of the ledger in other peers. Lastly the blockchain system includes chaincode which handles business logic agreed to by members of the network, evincing a smart contract.

For the purposes of explanation, the blockchain system 302 includes a financer blockchain system 304 and a provider network blockchain system 306. The financer blockchain system 304 has a financer peer 308 and a financer orderer 310, and the provider network blockchain system 306 has a provider network peer 312 and a provider network orderer 314. The financer blockchain system 304 is connected to a financer backend server 318 through a financer blockchain application 320, and the financer backend server 318 is in turn connected to a claimant device 322 for communicating with the claimant such as authenticating the claimant or sending transaction information for confirmation. Similarly, the provider blockchain system 306 is connected to a provider network backend server 324 through a provider network blockchain application 326, and the provider network backend server 324 is in turn connected to a provider device 328.

Figure 4:
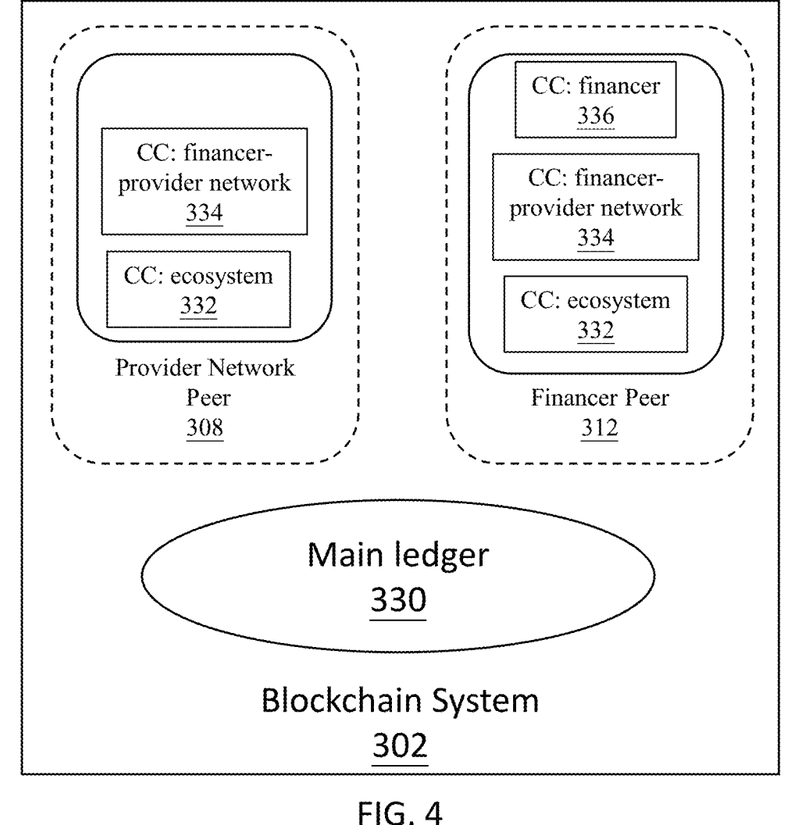
FIG. 4 is a block diagram of a blockchain system of FIG. 3.

FIG. 4 shows a block diagram of the blockchain system 302 of FIG. 3. The blockchain system 302 includes the financer peer 308 and the provider network peer 312 as explained above. The blockchain system also comprises a global ledger or main ledger 330. The financer peer 308 includes three layers of chaincode (denoted by CC in FIG. 4), the first layer being global chaincode: ecosystem 332, the second layer being transaction chaincode: financer-provider network 334 and the third layer being chaincode: financer 336. The provider network peer 312 includes two layers of chaincode, the global chaincode: ecosystem layer 332 and the chaincode: financer-provider network layer 334.

The first layer of chaincode allows the financer or the network provider to access the global ledger 330 to retrieve the hashed verification elements and compare with the hashed value from the original input obtained. The second layer of chaincode allows the financer and the network provider involved in the insurance claim transaction to order blocks that represent an insurance claim transaction and keep a record of each insurance claim transaction. The third layer of chaincode stores the smart contracts between the financer and its members and proof of claim of each insurance claim transaction. It also stores financer decision rules to confirm the eligibility of claimant, confirm the medical necessity of medical treatments and eligibility of medical service providers based on the inputs provided by the Provider, Provider Network and the Financer, and confirm the price of the medical treatment and the order of claiming which Financer first and sharing of costs between Financers and Claimants.

The three layers of chaincode are explained in more detail below.

Global chaincode is a definition of chaincode type, satisfying the following:
 code source read: All parties in system
 code source write: Access control powered by Github.
 data read: All parties in channel can get a copy of this general ledger
 data write: All parties in channel can write.
 endorsement: Any one. But endorsement restriction is enhanced by Key Level Endorsement feature.

Chaincode 'ecosystem' is of Global Chaincode type but enhanced with security concern. It is designed as follows:
 all functions of 'ecosystem' require a token as function input.
 token content will not be recorded directly, instead its hashed value is recorded as a representative.
 to avoid token leak in proposal response, token is passed into chaincode via Transient Map, instead of parameter list. This rule also applies to sensitive data in all other chaincodes in system.
 token listing is prohibited.
 token move: token is only able to move from a member to a Provider Network.
 token delete: only token owner is allowed to delete his tokens.
 token issue: only Financer is able to create token for its claimants.

Transaction chaincode is a definition of chaincode type, satisfying following:
 code source read: only two organizations involved in a transaction.
 code source write: only two organizations involved in a transaction.
 data read: only two organizations involved in a transaction. Powered by Private Data feature.
 data write: only two organizations involved in a transaction. Powered by Private Data feature.
 endorsement: both organizations are required. Transaction will be rejected if chaincode content has conflict among two organizations.

Chaincode 'Financer-Network' is of Transaction Chaincode type but enhanced with security concern. It is designed as following.
 Transparency: the payment amount calculation logic, interaction with chaincode 'ecosystem' and interaction with Financer external idempotent system can be witnessed and co-supervised by both Financer and Provider Network.
 Transaction is linked to PayToken to align token system in chaincode 'ecosystem'.

Table 1 below shows a sample token of the present invention.

TABLE 1

Sample list of token data

| Item | Description |
| --- | --- |
| Owner | Current token owner ID |
| Issuer | Token Issuer |
| Manager | Current token management organization ID |
| OwnerType | Type of token Owner |
| TokenType | Type of token, e.g PayToken, VerifyToken |
| ExpiryDate | Token Expiry date, optional in some case |
| Client | The Client Identity of last token operator. |
| MetaData | Other miscellaneous data |

The sample list of token includes an owner and owner type, an issuer, and a manager of the token, all represented by an ID. For example, the owner is the claimant, the issuer is the financer and the manager is the provider network. A token type is specified, which can be VerifyToken (first verification element) or PayToken (second verification element). Expiry date is optional and can be included in some cases where an appointment date is specified. Client identity can be the provider that reads the token. The entire token data is hashed and stored in the main ledger or global ledger and accessible for all parties such as financers and provider networks.

Table 2 below shows a sample data field of financer of the present invention.

TABLE 2

Sample field of financer

| No. | Name | Description (T)ype, Length (F)ormat | Generation Logic |
| --- | --- | --- | --- |
| 1 | ResponseCode | Unique code of financer's response (T) Alphanumeric, 5 (F) X9999 | X is the type of message for financer internal use "B0000" means valid insured person |

TABLE 2-continued

Sample field of financer

| No. | Name | Description (T)ype, Length (F)ormat | Generation Logic |
|---|---|---|---|
| | | | Refer to Table A for full list of Response Code together with Response Message and Technical Remarks |
| 2 | ResponseEngMessage | Response English Message (T) Alphanumeric, 500 | Predefined description maintained in system table |
| 3 | ResponseChiMessage | Response Chinese Message (T) Alphanumeric, 500 | Predefined description maintained in system table |
| 4 | TechnicalRemarks | (T) Alphanumeric, 100 | Predefined description maintained in system table |
| 5 | GPCoPayAmt | General Practitioner ("GP") co-payment amount to be collected from member (T) numeric | 1—No co-payment should be collected from member |
| 6 | GPXtraMedLimit | GP extra medication limit provided by financer (T) numeric | 1—Bill on voucher as medically necessary |
| 7 | SPCoPayAmt | Specialist Practitioner ("SP") co-payment amount to be collected from member (T) numeric | 1—No co-payment should be collected from member 2—No credit service is provided |
| 8 | SPXtraMedLimit | SP extra medication limit provided by financer (T) numeric | 1—Bill on voucher as medically necessary 2—No credit service is provided |
| 9 | SPReferLetter | SP Referral Letter Indicator (T) Alphabetic, 1 | Y—Referral letter is required for SP consultation N—Referral letter is NOT required for SP consultation |
| 10 | EligibilityDesc | Insured eligibility description (T) Alphanumeric, 999 for each line | Commentary about coverahe |
| 11 | PHSCoPayAmt | Physiotherapy co-payment amount to be collected from member (T) numeric | 2—No credit service is provided |
| 12 | TCMCoPayAmt | Traditional Chinese Medical co-payment amount to be collected from member (T) numeric | 2—No credit service is provided |
| 13 | LabBenefit | Lab benefit (T) Alphanumeric, 5 | No credit service when returned value is empty |
| 14 | IPCredit | In-patient benefit credit service eligibility (T) Alphanumeric, 1 | Y—in-patient credit service is entitled N—NO credit service is entitled |
| 15 | HashedMemberKey | Identifier for each insured | |

The sample field mainly includes the proof of insurance that needs to be collected for the insurance transaction, and also the various types of transaction amounts and claim limits between the financer and the claimant based on the contract between the financer and the claimant. The hashed member key of the claimant is also stored.

Table 3 below shows a sample list of response code of Table 2.

TABLE 3

Sample list of response code

| No. | Response Code | Response Message | Technical Remarks |
|---|---|---|---|
| 1 | W1001 | Invalid medical group | Blank |
| 2 | W1002 | Reference number NOT provided | Request ticket number NOT provided |
| 3 | W1003 | Reference number duplicated | Request ticket number duplicated |
| 4 | W1004 | Invalid user ID | Blank |
| 5 | W1005 | Login failure | Blank |

TABLE 3-continued

Sample list of response code

| No. | Response Code | Response Message | Technical Remarks |
|---|---|---|---|
| | | | it also includes cases: that the caller's IP does not in authorized list user id does not exist |
| 6 | W1006 | Invalid date of service | Blank |
| 7 | W1007 | Date of service beyond backdate allowable period | Blank |
| 8 | W1008 | Insured information NOT provided | Member key 1 NOT provided |
| 9 | W1009 | Incorrect Insured information Format | Member keys NOT follow the format embedded on medical card (If Member Key 2 is empty, Member Key 1 MUST contain one and only one slash "/") |
| 10 | W1010 | Doctor code NOT provided | Blank |
| 11 | W1011 | Invalid doctor code | Blank |
| 12 | W9001 | System not available | Financer System Maintenance is in Progress |
| 13 | W9002 | Please try again. | Systems communication time-out (This response results whenever NO response code obtained from Back-end) |
| 14 | B0000 | Valid insured person/ Claim submitted/ Claim voucher voided | Blank |
| 15 | B1001 | Invalid doctor code | Blank |
| 16 | B1002 | Doctor code terminated | Blank |
| 17 | B1003 | Invalid insured person | Blank (Policy terminated) |
| 18 | B1004 | Medical card not yet effective | Blank |
| 19 | B1005 | Insured person terminated | Blank (Insured person under an in-force policy terminated) |
| 20 | B1006 | Medical card not accepted at this clinic | Blank |
| 21 | B1007 | Insurance Policy is now being processed for renewal. Data needs updating and Healthcare Card (if any) is suspended during this period. | Blank |
| 22 | B1008 | Your outpatient GP &/or SP consultation has exceeded maximum number of visits per policy year or exceeded maximum limit per policy year; and your Healthcare Card is suspended. If you have any queries, please call the service hotline on the back of your Healthcare Card. | Blank |
| 23 | B1009 | Credit Facility Services on hold. Healthcare Card is suspended. | Blank |

The list of response codes covers a set of situations where the token will then be unable to be processed to conduct an insurance transaction.

Table 4 below shows a sample insurance transaction entry in the blockchain system of the present invention.

TABLE 4

Sample insurance transaction entry in blockchain system

| Field No. | Name | Data Type | Description |
|---|---|---|---|
| 1 | Voucher | Char | Voucher No. |
| 2 | Doctor | Char | Doctor code by financer |
| 3 | Service Type | Char | Current Procedural Terminology Code (CPT4) |
| 4 | Diagnosis | Char | International Statistical Classification of Diseases and Related Health Problems Code (ICD9) |

TABLE 4-continued

Sample insurance transaction entry in blockchain system

| Field No. | Name | Data Type | Description |
|---|---|---|---|
| 5 | Benefit Code | Char | Benefit category code.<br>PHY—General Practitioner<br>SPL—Specialist Practitioner<br>PHS—Physiotherapy<br>LAB—X-Ray & Laboratory<br>ACU—Acupuncture<br>BST—Bonesetter<br>HER—Chinese Herbalist<br>ROE—Oral Examination/Scaling & Polishing |
| 6 | ClaimAmt | Numeric | Claim Amount in 9999999.99 |
| 7 | ServiceDate | Numeric | ServiceDate in yyyymmdd format |
| 8 | Location Code | Char | Location Code for the Doctor |
| 9 | Medical Group | Char | Medical Group Code |
| 10 | PayToken | Char | QR code used |
| 11 | ClinicID | Char | Clinic ID by provider network |
| 12 | DoctorID | Char | Doctor ID by provider network |
| 13 | MemberKey | Char | MemberKey: G000803.GP/1723 |
| 14 | AgreedFee | Numeric | Fee per visit financer agree to pay provider network per visit |
| 15 | Co-payment | Numeric | Copayment paid by insured |
| 16 | Reference Letter Needed | Boolean | Whether doctor reference letter is needed |
| 17 | ExtraMedi_input | Numeric | Extra Medicine Claim Amount |
| 18 | XtraMedAmt | Numeric | Extra Medicine Claim Limit |
| 19 | SickLeave | Numeric | Sick leave days number |
| 20 | ExtraMedName | Char | Extra medicine names |

The insurance transaction entry includes identification of the provider by both the financer and provider network, the date and amount of the transaction, the token used for triggering the transaction, hashed member key, and also potential agreements between the financer and provider network such as a fee paid by financer to the provider network for each transaction. Other information related to the transaction, in this case medical treatment, is also stored.

Potential Benefits

A first advantage of the present invention is allowing insurance claim transactions to be conducted even when the claimant is offline when the claimant visits the provider while ensuring security, as long as the provider is connected to the internet. The verification elements provided to the claimant can be shown to the provider in an offline manner, for example as a two-dimensional barcode printed out on paper or captured on a screen. The claimant device is connected to the internet when the verification elements such as the two-dimensional barcodes are generated, and a copy of the hashed verification elements is stored in the global ledger of the blockchain system. The provider device is connected to the internet and blockchain system to retrieve the necessary information for verifying the claimant when the verification elements are read. Alternatively, a member card of the present invention allows the claimant to be offline at all times, but the provider device needs to be connected to the internet to verify the member card.

Another advantage of the present invention is the use of two distinct verification elements in different steps of the method. The first verification element verifies the eligibility of the claimant and the provider, and the second verification element authorizes the transaction itself. This prevents potential situations where the claimant and the provider does not have the same understanding as to the co-payment amounts and claim limits before the task is performed, or situations where the provider proceeds to submit the claim even the claimant has decided not to claim insurance after the eligibility is verified. The present invention provides improved transparency between claimant and provider to understand and agree to the payment arrangement between the two verification steps.

An important issue regarding records on blockchain ledger is fraud claiming by appropriating the verification elements and attempting to copy and reuse the verification elements for double claiming. In the global ledger, all provider networks and financers can access the ledger records, therefore the risk of someone faking a transaction cannot be eliminated. In a preferred embodiment of the present invention, only a hashed value of the second verification element is stored on the blockchain ledger, and the hash is irreversible such that one cannot obtain the unhashed verification element even if they have the hashed value. In a specific embodiment, the hash is a SHA512 hash. When a transaction chaincode is triggered and the second verification element needs to be verified, a hash has to be performed on the original unhashed second verification element and then compared with the stored value on the global ledger, thereby ensuring that only parties that has the original unhashed verification element can perform the authorized actions. More sensitive information related to the transaction, claimant or provider identity and insurance policies are stored in private ledgers that are only accessible by authorized parties. Such information may include ID card numbers for the claimant or provider issued by governments, member ID of the claimant at the financer or provider ID of the provider at the provider network, claim history of the claimant (in this case medical history), and claim amounts.

The exemplary embodiments of the present invention are described above. It is understood that the embodiments are only illustrated for the purpose of explaining the concept of the present invention, and one skilled in the art can make adjustments or alterations within the scope and spirit of the present invention. The scope of protection of the present invention is defined by the claims as set forth below.

What is claimed is:

1. A method for conducting and recording insurance claims transactions using blockchain, comprising the steps of:
   receiving a first verification element from a claimant at an authenticated provider device of a provider;
   verifying an eligibility of said claimant at a financer and an eligibility of said provider at a provider network, according to said first verification element and said provider device;
   receiving a second verification element from said claimant at said provider device, said second verification element being distinct from said first verification element;
   conducting said insurance claim transaction by triggering a transaction chaincode at said provider device according to said second verification element;
   recording an entry of said insurance claim transaction on a blockchain ledger of a blockchain system;
   wherein a hashed value of an irreversible hash of said first verification element and said second verification element is stored in a global ledger of said blockchain system, and said entry of insurance claim transaction is stored in a private ledger of said blockchain system only accessible by said financer and said provider network; wherein a proof of claim of said insurance claim transaction is collected from said provider device at the time said transaction chaincode is triggered;
   wherein said claimant device is an NFC-enabled member card, said first verification element and said second verification element comprises a card identifier unique to said member card and an encrypted claimant identifier of said claimant at said financer;
   wherein said provider device is an NFC card reader having a unique private key, said NFC card reader encrypts said claimant identifier and said card identifier of said NFC-enabled member card with said private key to obtain an encrypted member data, where said eligibility of said claimant is verified by decrypting said encrypted member data at a provider network backend server connected to the provider device, where said private key is stored on said provider network backend server and is unknown to said provider, as such a successful decryption automatically confirms said eligibility of both said claimant and provider at the same time;
   whereby said verifying steps being performed at said provider network with said unique private key unknown to said provider, and using said irreversible hash preventing said verification elements to be retrieved from a hashed value thereof, ensures that said insurance claim transaction is conducted through said provider network based on a stored insurance policy of said claimant on said provider network, thereby preventing fraudulent insurance claims due to appropriating verification elements or double claiming.

2. The method for conducting and recording insurance claim transactions using blockchain of claim 1, wherein said first verification element and said second verification element comprises a two-dimensional barcode generated by a claimant device authenticated by said financer.

3. The method for conducting and recording insurance claim transactions using blockchain of claim 1, wherein said first verification element and said second verification element comprises an alphanumerical string generated by a claimant device authenticated by said financer.

4. The method for conducting and recording insurance claim transactions using blockchain of claim 1, wherein said irreversible hash is a SHA512 hash.

5. The method for conducting and recording insurance claim transactions using blockchain of claim 1, wherein said NFC-enabled member card comprises a manufacturer block which is only readable for preventing cloning of said member card.

6. The method for conducting and recording insurance claim transactions using blockchain of claim 1, wherein said encrypted member data is dynamically generated and includes a date or time stamp.

7. The method for conducting and recording insurance claim transactions using blockchain of claim 1, wherein said step of conducting said insurance claim transaction comprises the steps of:
   receiving an original second verification element at said provider device;
   performing said irreversible hash on said received original second verification element to generate a hashed second verification element;
   comparing said hashed second verification element generated in the above step to said hashed value of said second verification element stored in said global ledger;
   conducting said insurance claim transaction if said hashed second verification element generated matches said hashed second verification element stored in said global ledger.

8. The method for conducting and recording insurance claim transactions using blockchain of claim 1, further comprising the steps of:
   determining a payment arrangement between said claimant and said financer according to said first verification element;
   receiving an input of extra claimable items at said provider device;
   finalizing a claim amount of said insurance claim transaction according to said payment arrangement and said extra claimable items;
   obtaining a claim amount of said insurance claim transaction from said private ledger;
   electronically transferring said claim amount from said financer to said provider network, and from said provider network to said provider.

9. The method for conducting and recording insurance claim transactions using blockchain of claim 1, wherein said first verification element and said second verification element expires after receiving by said provider device once.

10. The method for conducting and recording insurance claim transactions using blockchain of claim 1, wherein said blockchain system comprises a first chaincode layer which is global to all peers of said blockchain system, a second chaincode layer only accessible by said financer and said provider network, and a third chaincode layer only accessible by said financer.

11. The method for conducting and recording insurance claim transactions using blockchain of claim 10, wherein said third chaincode layer communicates with said provider device to confirm said eligibility of said claimant, confirm a necessity to perform said claimable task based on inputs of said provider into said provider device, and confirm a price of said claimable task.

12. The method for conducting and recording insurance claim transactions using blockchain of claim 1, wherein said blockchain system is a Hyperledger Fabric blockchain system.

13. A system for conducting and recording insurance claim transactions using blockchain, comprising:
- a blockchain system;
- a financer backend server connected to said blockchain system through a financer blockchain application;
- a provider network backend server connected to said blockchain system through a provider network blockchain application;
- a claimant device connected to said financer backend server;
- a provider device connected to said provider network backend server;
- wherein said provider device receives a first verification element from said claimant device to verify an eligibility of a claimant at a financer and through claimant device, and to verify an eligibility of a provider at a provider network though said provider device; said provider device receives a second verification element distinct from said first verification element to conduct an insurance transaction by triggering a transaction chaincode;
- wherein said blockchain system comprises a global ledger and a private ledger, an irreversible hashed value of said first verification element and said second verification element is stored in said global ledger, and an entry of said insurance transaction is recorded in said private ledger only accessible by said financer backend server and said provider network backend server;
- wherein a proof of claim is collected from said provider device at the time said insurance transaction is conducted;
- wherein said claimant device is an NFC-enabled member card, said first verification element and said second verification element comprises a card identifier unique to said member card and an encrypted claimant identifier of said claimant at said financer;
- wherein said provider device is an NFC card reader having a unique private key, said NFC card reader encrypts said claimant identifier and said card identifier of said NFC-enabled member card with said private key to obtain an encrypted member data, where said eligibility of said claimant is verified by decrypting said encrypted member data at said provider network backend server, where said private key is stored on said provider network backend server and is unknown to said provider, as such a successful decryption automatically confirms said eligibility of both said claimant and said provider at the same time;
- whereby said verifying steps being performed at said provider network with said unique private key unknown to said provider, and using said irreversible hash preventing said verification elements to be retrieved from a hashed value thereof, ensures that said insurance claim transaction is conducted through said provider network based on a stored insurance policy of said claimant on said provider network, thereby preventing fraudulent insurance claims due to appropriating verification elements or double claiming.

14. The system for conducting and recording insurance claim transactions using blockchain of claim 13, wherein said first verification element and said second verification element comprises a two-dimensional barcode generated by said claimant device authenticated by said financer.

15. The system for conducting and recording insurance claim transactions using blockchain of claim 13, wherein said first verification element and said second verification element comprises an alphanumerical string generated by a claimant device authenticated by said financer.

16. The method for conducting and recording insurance claim transactions using blockchain of claim 13, wherein said irreversible hash is a SHA512 hash.

17. The system for conducting and recording insurance claim transactions using blockchain of claim 13, wherein said NFC-enabled member card comprises a manufacturer block which is only readable for preventing cloning of said member card.

18. The system for conducting and recording insurance claim transactions using blockchain of claim 13, wherein said encrypted member data is dynamically generated and includes a date or time stamp.

* * * * *